United States Patent [19]

Rollini et al.

[11] Patent Number: 5,022,429
[45] Date of Patent: Jun. 11, 1991

[54] VALVE ASSEMBLY FOR PLUMBING FIXTURE

[75] Inventors: Pietro Rollini, Novara, Italy; Domenic Luisi, Woodbridge, Canada

[73] Assignee: Rubinet Brass Canada Limited, Woodbridge, Canada

[21] Appl. No.: 417,437

[22] Filed: Oct. 5, 1989

Related U.S. Application Data

[63] Continuation of Ser. No. 295,080, Jan. 9, 1989, abandoned.

[30] Foreign Application Priority Data

Dec. 20, 1988 [CA] Canada .................................. 586402

[51] Int. Cl.[5] .......................... E03C 1/01; F16K 11/02
[52] U.S. Cl. .......................................... 137/218; 4/195; 4/446; 137/625.46; 137/636.4
[58] Field of Search ................ 4/194, 195, 420.3, 445, 4/446; 137/218, 625.46, 636.4

[56] References Cited

U.S. PATENT DOCUMENTS

| | | | |
|---|---|---|---|
| 1,607,935 | 11/1926 | Ackley | 4/194 |
| 3,144,873 | 8/1964 | Moore et al. | |
| 3,180,352 | 4/1965 | Kersten et al. | |
| 4,224,962 | 9/1980 | Orszullok | |
| 4,326,671 | 4/1982 | Goguen | |
| 4,589,438 | 5/1986 | Breda | |
| 4,700,885 | 10/1987 | Knebel | |

FOREIGN PATENT DOCUMENTS 2184205  6/1987  United Kingdom .

Primary Examiner—Gerald A. Michalsky
Attorney, Agent, or Firm—Fleit, Jacobson, Cohn, Price, Holman & Stern

[57] ABSTRACT

A valve assembly comprising three main body parts removably secured together to permit ready assembly and disassembly; one part (11) incorporating a diverter valve in the form of a ceramic cartridge made of a plurality of discs (20, 21, 22); a further part having a vacuum breaker or back-flow preventer (42) comprising a freely movable check valve (45) located in an inlet flow path, for travel between upper and lower valve seats in response to changes in atmospheric pressure and flow direction; and when desired a pop-up drain or waste control rod (15) having no integral guide means associated therewith and operating smoothly and reliably while being inexpensive and simple to manufacture. The assembly may be adapted to receive a decorative escutcheon which permits its use in a wide variety of applications.

20 Claims, 3 Drawing Sheets

VALVE ASSEMBLY FOR PLUMBING FIXTURE

This is a continuation application of prior U.S. patent application Ser. No. 07/295,080 filed Jan. 9, 1989, now abandoned.

FIELD OF THE INVENTION

This invention is for a valve assembly for use with plumbing fixtures where diversion of fluid flow is required along with back flow prevention means. It is particularly useful for bidets where it may incorporate not only diverter valve means and back-flow preventer or vacuum breaker means, but also pop-up waste or drain control means.

BACKGROUND OF THE INVENTION

Diverter valves have been known for sometime for a variety of purposes. They are well known for use in bidets, tub-shower combinations and whirlpools. In bidets, the water flow may be diverted from the rim of the bidet to a spray outlet located towards the front of the bidet. It is also known to incorporate back-flow preventers or vacuum breakers in such diverter valves in order to prevent contamination of the potable water supply.

There has been disclosed, a diverter valve for use with a bidet with an integrally formed vacuum breaker in U.S. Pat. No. 4,589,438 issued May 20, 1986 to Silvano Breda. The diverter valve comprises a main body chamber with inlet and outlet openings, a centrally disposed vertical inlet tube having a floating vacuum breaker assembly at its remote end movable in response to changes in flow direction and pressure, the main chamber having another cylinder mounted therein with lateral openings, which openings may selectively engage the lateral oulet openings of the central chamber.

In British Pat. Application No. GB 2 184 205 A, published June 17, 1987 in the name of Twyfords Limited, there is described a bidet valve which includes a hand actuated diverter and a pop-up waste control. The fitting does not include a vacuum breaker or back-flow preventer. The diverter may be mounted in a spray nozzle or piping thereto and permits flow to be diverted by actuating a quarter turn ring to positively seat and unseat a valve which controls flow path access. The pop-up waste control rod is quite separate in operation and location from the diverter valve.

The use of ceramic valve discs in mixing valves for plumbing is known. An example of one arrangement is found in U.S. Pat. No. 4,700,885 issued Oct. 20, 1987 to Knebel wherein three ceramic discs are used in a housing having two inlets and one outlet, the disc on the inlet side is stationary, while the second disc can be turned from outside to control flow volume, and the third disc can be slid linearly against the second disc for temperature adjustment by means of a manually adjustable thermostat. The second disc is immovably secured to a shaft of a motor regulator. This assembly is complex and requires two separate controls for operation of the discs.

Bidets are becoming very popular in North America, although they have been in general use in Europe for quite a long time. In order to gain CSA and UL approval for faucets, valves, and the like, used in conjunction with bidets and other plumbing fixtures, where there could be backflow of contaminated water into the potable water supply, it is necessary that one incorporate a vacuum breaker or back-flow preventer means therein. However, European faucets, valves, etc., do not require the incorporation of any such means as their standards are different. Since the evolution of bidets in Europe is more advanced, the range of fixtures is very broad with more diverse styles, colors and finishes available. However, a large proportion of such fixtures only include three preformed apertures or holes for the mounting of valves, faucets, etc. and thus such fixtures are not readily employed in circumstances, usually new construction, where the Standards Association approvals are necessary. Normally, four apertures or preformed holes are required in bidets to accommodate the pop-up waste control rod, the hot and cold faucets and the diverter valve. Thus, there has developed a need to provide a diverter valve which not only includes a vacuum breaker or back-flow preventer function, but also one which may include a waste or drain control so that it may easily be incorporated into a typical European three-hole bidet fixture, yet still being capable of being employed in bidet fixtures manufactured in Canada and the United States.

At the same time, there is a need for a unit which is easily manufactured, assembled and maintained. Easy access to the assembly once installed is important, since it facilitates easy servicing. Simplicity of construction and operation also play an important role, since this ensures that the level of expertise of the installer, or service personnel need not be high. These factors are also frequently associated with long life. In addition, because of a consumer fashion orientation, products of this type are subject to changes in style and colour. Thus a variety of faucets and valve covers are desirable to offer the consumer. Such desires can only be accommodated effectively with a large and wide range of inventory. Since this is costly for the supplier, any construction or design which would help reduce this burden would be attractive.

SUMMARY OF THE INVENTION

It is an object of this invention to provide a valve assembly for mounting on a plumbing fixture including a body having a fluid inlet and corresponding flow paths and a plurality of fluid outlets and corresponding flow paths, the assembly also having combined fluid flow and drain control means which on reciprocal axial movement opens or closes a waste drain in the fixture and on rotational movement permits selective flow of fluid from the fluid inlet to one or more fluid outlets.

This objective is achieved by the invention which provides a valve assembly for mounting on a plumbing fixture having three main body parts which are removably secured together to permit ready assembly and disassembly. The structure incorporates into one unit, a diverter valve which is in the form of a ceramic cartridge made of a plurality of discs, a vacuum breaker or back-flow preventer which comprises a freely movable check valve located in an inlet flow path for travel between upper and lower valve seats in response to changes in atmospheric pressure and flow direction, and when desired a control rod for a pop-up drain or waste control valve of conventionally known design. No integral guide means are associated with the valve. It operates smoothly and reliably and yet is inexpensive and simple to manufacture. The assembly may be adapted to receive a decorative escutcheon which permits its use in a wide variety of applications.

Thus, the present invention provides a valve assembly comprising a body with a fluid inlet and corresponding flow paths and a plurality of fluid outlets and corresponding flow paths, a passage connecting the inlet flow paths to the outlet flow path, a central aperture for receiving a rod, the aperture being adapted to permit reciprocal vertical and axial movement of the rod therein; a lower body portion to which the inlets and outlets are connected having a part of the central aperture for receiving the rod, the lower body portion having a hollow cylindrical upper end adapted to receive three discs, a vertical pin and located therein, on which the three discs mounted, one on top of the other, each having a central aperture therein for receiving the rod, while permitting free vertical movement of the rod therein, the middle disc being rotatable about the vertical pin and with the rod, on axial movement of the rod, relative to the top and bottom discs which are fixed in place by the pin, additional apertures are provided in the discs which on being aligned provide fluid flow through the assembly from an inlet to a selected outlet; a middle body portion having a recess for receiving the top of the pin, a part of the central aperture for receiving the rod, and a number of apertures corresponding to the number of flow paths in the assembly, the middle body portion having a hollow cylindrical upper end adapted to receive a top body portion; a spool shaped valve located in each inlet flow path contained within the middle and top body portions, the inlet flow path being open to atmosphere and sized to contain and guide the spool shaped valve which has narrower upper and lower ends which project into and move within narrower, upper and lower portions, respectively, of the inlet flow path so that the valve remains aligned within the path but travels freely therein between upper and lower valve seats in response to changes in fluid flow direction and atmospheric pressure, and sealing means on the valve for engaging the valve seats, the top body portion having a part of the central aperture and a lower hollow cylindrical projection for receiving the rod.

The valve assembly preferably includes a pop-up drain or waste control rod which is the rod which is centrally located in the assembly structure. The valve assembly is generally cylindrically shaped, because it is far simpler to manufacture and lends itself more readily to use on fixtures which contain circular shaped preformed apertures. In addition, the manufacture of such products is far simpler.

A very useful feature of the present valve assembly is that any variety of escutcheon may be placed over it providing a diverter which may therefore have all or any of a variety of fashion aspects to it such as those of styling, colour, finish and the like. Thus, inventory for such a product is tremendously reduced since one needs only one valve assembly on which can be mounted virtually any type of escutcheon. The handle selected may also be one of those generally available which may then be matched with other handles used in the facility. Thus the valve assembly is very versatile.

The upper, middle and lower portions of the valve assembly may be removably secured together by cooperative engagement means, which for most purposes comprise cooperating screw threads, although set screws may also be employed. The latter are preferably employed to secure the top body portion to the middle body portion.

The three discs are preferably ceramic material and are of the same dimension, that is, diameter and depth. These discs may be described as a ceramic cartridge. The top and bottom discs are formed with the same number of apertures, while the middle disc is formed with elongated apertures, except for the central aperture. The aperture for the pin in the middle disc is sized so that it moves easily and reliably therein. The central aperture in the middle disc and the rod are formed with cooperating shapes which ensure that rotation of the rod produces a similar rotation in the disc. In the present instance, cooperating hexagonal shapes are chosen, but others could be selected, just as alternative means for producing this type of connection could be chosen as long as reciprocal axial movement of the rod is permitted. These apertures are located such that, when the middle disc is in one position, access between one outlet flow path and the or one inlet is provided, and in another position another outlet flow path is connected with the or one inlet. Usually the movement is achieved by means of a handle attached to the top of the rod, which may also control the pop-up waste or drain control rod. In the event the structure only has one outlet, or has more than two outlets, the numbers of discs may be reduced or increased appropriately. Alternatively the sizes of the discs and/or number of apertures could be increased.

The pop-up waste or drain control rod may be formed in a number of pieces according to conventional methods. The base of the rod is secured, usually by screwing into the rod portion which is mounted within the assembly.

The upper surface of the top ceramic disc and the lower surface of the bottom ceramic disc each includes sealing means, for example O-rings provided in recesses at the top edges of the apertures for flow to ensure sealing of the flow path and to prevent leakage of the assembly. No seals are necessary between the ceramic discs themselves as the ceramic material ensures reciprocally water tight contact.

Sealing means, which are preferably O-rings, preferably made of silicone or rubber are located on the exterior of the top body portion to provide a seal between the top body portion and the middle body portion. In addition, another sealing means, preferably an O-ring of the composition stated earlier is located around the end aperture in which the rod is received and is sized so that the end of the lower hollow cylindrical projection of the top body portion is received thereon and a seal is created whereby flow of fluid through the central aperture in which the pop-up drain rod is received is prevented. This again seals the assembly against leakage.

The vacuum breaker or back-flow preventer valve includes sealing means, which are preferably O-rings usually made of silicon or rubber, on the outer edges of each end of the spool. The sealing means ensure that when water is flowing in through the inlet, the atmospheric vent at the top of the outlet is sealed to prevent flow to the outside of the assembly, while if any back-flow occurs, the inlet flow path is sealed thereby preventing the flow of any contaminated water into the potable water supply. The shape of the check valve is selected to permit water flow around the spool, with the ends preferably formed in the shape of a star or a cruciform. This shape permits water or air to initiate movement of the valve from one position to the other, ensuring that it does not get stuck as a result of adhesion between surfaces, a circumstance which is likely to develop where the extended portions of the spindle are formed in a solid piece. The valve itself floats freely up and down within the chamber which chamber is specially sized to ensure that the valve remains alligned in vertical position within the chamber. The valve is preferably made of a plastics material such as ABS, the selection of material being based on the requirement that it be hard and light. Obviously the valve is very inexpensive and simple to manufacture. The shape of the valve and the shape of the path are such that the operation of the valve is smooth and reliable.

It will be seen that set screws may be used to attach the top body portion to the middle body portion of the assembly. A collar or retaining ring is placed over the middle body portion, which collar or ring is internally screw threaded and mates or engages with external screw threads located on the exterior of the hollow cylindrical portion of the lower body portion. Thus, the assembly can easily be put together and taken apart for servicing.

In a more preferred form, there is provided a valve assembly comprising a body with a fluid inlet and a corresponding flow path and two fluid outlets and two corresponding flow paths, a passage connecting the inlet flow path to the outlet flow paths, a central aperture for receiving a rod, the aperture being adapted to permit reciprocal axial movement of the rod therein; a lower body portion to which the inlet and outlets are connected and having a part of the central aperture adapted to receive a pop-up drain or waste control rod; the lower body portion having a hollow cylindrical upper end adapted to receive three ceramic discs, a vertical pin located therein on which the three discs are mounted, one on top of the other, each having a central aperture therein for receiving the rod, the middle disc having three kidney shaped apertures therein and being rotatable with the rod on rotational movement thereof, middle disc movement being restricted by the length of the aperture in which the pin is located and being relative to the top and bottom discs which are fixed in place by the pin which fits through correspondingly shaped apertures therein, each of the top and bottom discs having three additional round apertures spaced about the disc on an annulus thereof, all apertures in all discs being located such that when the middle disc is rotated in either direction, the inlet flow path and a respective one of the outlet flow paths is connected; a middle body portion having a recess for receiving the top of the pin, a part of the central aperture for receiving the rod, and an aperture for each of the flow paths; the middle body portion having a hollow cylindrical upper end adapted to receive a top body portion; a spool shaped valve located in the part of the inlet flow path contained within the middle and top body portions, the flow path being open to atmosphere through the top body portion and sized to contain and guide the spool shaped valve having star or cruciform shaped upper and lower ends which project into and move within narrower upper and lower portions, respectively, of the flow path, the valve travelling freely between upper and lower valve seats, in response to changes in fluid flow direction and atmospheric pressure, sealing means on the valve to engage the valve seats, the top body portion having a part of the central aperture and a lower hollow cylindrical projection and associated sealing means for receiving the pop-up drain rod and sealing it from the passage connecting the inlet and outlet flow paths, which rod extends above the top of the body to permit a handle to be attached thereto, the valve assembly being adapted to receive a decorative escutcheon when required; the top and middle body portion being joined by set screws and including sealing means for each screw and between the portions; the middle and lower body portion being secured together by a removable retaining ring; and mounting means for securing the valve assembly to a bidet.

Where the valve assembly is installed in a bidet fixture, it is usual to provide in the assembly a lateral outlet which feeds to the rim of the bidet. This is preferably located in the base of the lower body portion. Where the assembly is used in a tub shower arrangement or in a whirlpool, then the side outlet may be replaced with a lower outlet.

The valve assembly is generally mounted between hot and cold supplies or a single supply from hot and cold sources. The assembly, once mounted, is then covered with a decorative escutcheon which is fitted thereover and secured by conventional means, along with a handle which is attached to the top portion of the rod. Where the rod is a pop-up drain or waste rod, then the handle can be lifted up and down to operate the drain. Movement of the handle in either direction will divert flow to the rim of the bidet or to the spray. It should be noted that the flow control is such that it is positive and complete and hence there is no operation of both outlets simultaneously, unless desired. This is particularly advantageous in use.

The valve assembly is normally made of brass, although other conventionally known materials may be substituted. All sealing means are preferably made of silicon or rubber materials. The check valve, as will be seen is light and durable and hence ABS is a good material choice. Others will be obvious to those familiar with this type of requirement.

BRIEF DESCRIPTION OF THE DRAWINGS

In the accompanying drawings which are meant to illustrate a preferred embodiment of the present invention.

DESCRIPTION OF THE PREFERRED EMBODIMENTS

Figure 1:
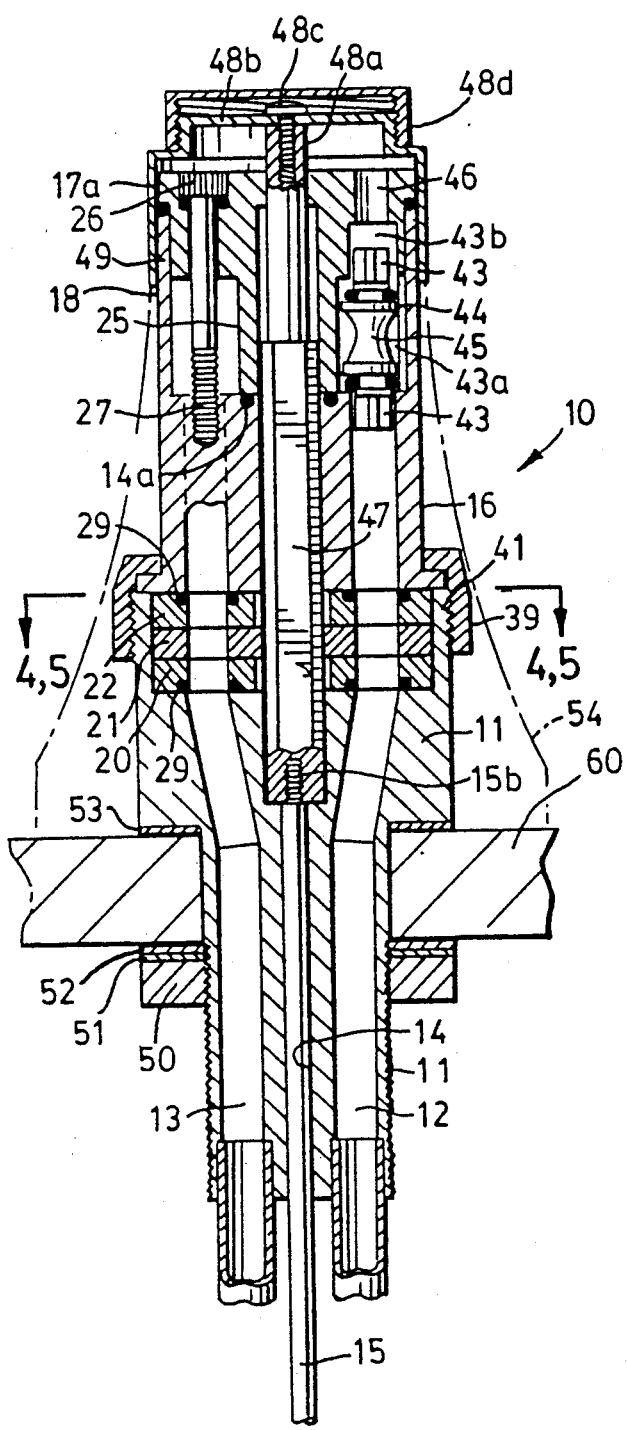
FIG. 1 is an axial cross-sectional view of a bidet valve assembly according to the present invention.
Figure 2:
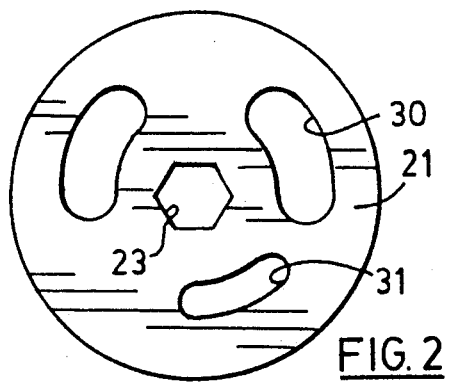
FIG. 2 is a top plan view of a middle disc.
Figure 3:
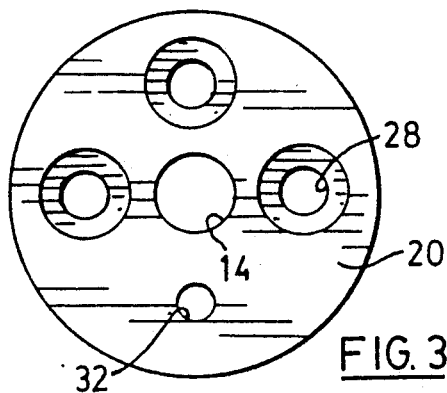
FIG. 3 is a top plan view of an upper or lower disc.

Referring now to the drawings, the valve assembly is designated generally at 10 and comprises three body portions: a lower body portion 11, a middle body portion 16 and an upper or top body portion 17. The lower body portion 11 includes an inlet 38, an outlet 37 to the spray and an outlet 36 to a rim of a bidet (not shown). The lower body portion includes a narrower, cylindrical base portion 34 from which inlet 38 and outlet 37 extend. Included on the base portion 34 is an externally screw threaded portion 35. The base portion 34 (as can be seen in FIG. 1) is fed through an aperture in a bidet 60 (usually formed in a rear mounting space of the bidet, not shown), with an upper washer 53, preferably made of silicone or rubber and located between the bidet upper surface and the lower surface of lower body portion 11. Another washer 52 is mounted on portion 34 adjacent the lower surface of the bidet, another brass washer 51 is placed adjacent the washer 52, and a shank nut 50 is turned onto the screw threaded portion 35 of base 34 and tightened against the washers 51 and 52 whereby the valve assembly 10 is secured to the bidet. The inlet and outlet are joined to a water supply and to a bidet spray (not shown), respectively. Usually copper pipe or stainless flex tubes are used for these connections. An escutcheon or cover portion 54 is shown in dotted outline in FIG. 1. This piece may be any shape, material or color depending on the design and style of the bathroom where the bidet fixture is located. There is a height requirement (CSA) for valve assemblies used with bidets that such assemblies rise a certain height above the rim of the bidet, and the present assembly meets it easily. In addition, this particular feature means that parts' inventory and hence costs may be reduced while consumers' desires are readily met.

Upper part 11a of lower body portion 11 is hollow, cylindrical and provided with an externally screw-threaded portion 41. A vertical pin 19 projects from the base of the hollow portion 11a which fits into apertures 32, in each of discs 20 and 22, and 31 in disc 21, and then into recess 33 which is shown in outline in the lower part of middle body portion 16. It should be noted that apertures 32 are sized to prevent any movement of the discs 20 and 22, while aperture 31 is elongate or kidney shaped and permits disc 21 to move about a quarter turn or less relative to pin 19. Three circular apertures 30, one of which connects to inlet 38, one to outlet 37 and the other to outlet 36 are found in lower body portion 11. Discs 20, 21 and 22 are preferably made of ceramic material and are mounted in this sequence upon one another with rod 15 located in a central aperture 14 in each disc and in each piece of the assembly, such that disc 21 can be rotated relative to discs 20 and 22 on rotation of rod 15, the path of travel being limited by the size of aperture 31 in disc 21. Pin 19 in apertures 32 secures upper and lower discs 20 and 22 against any rotational movement.

Figure 4:
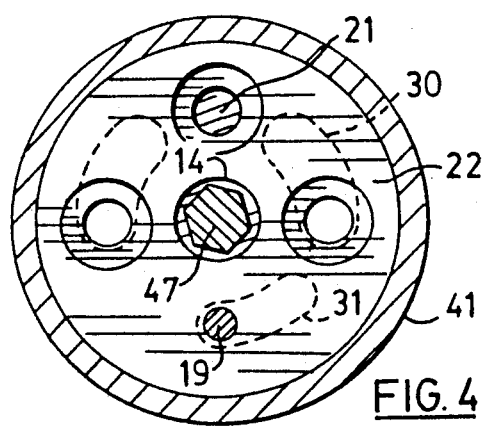
FIGS. 4 and 5 are cross-sectional views taken along line 4,5—4,5 of FIG. 1 where fluid flow is selected to the rim and the front spray, respectively, of the bidet.
Figure 5:
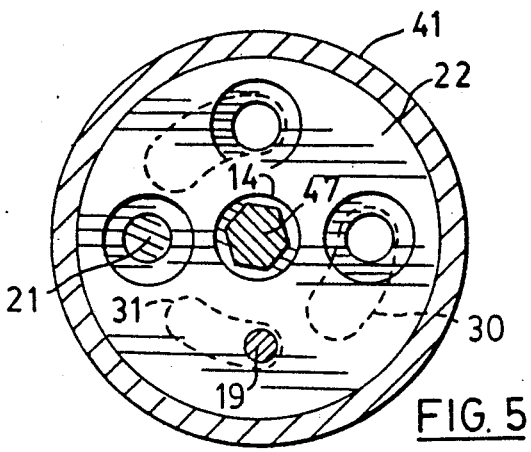
Figure 6:
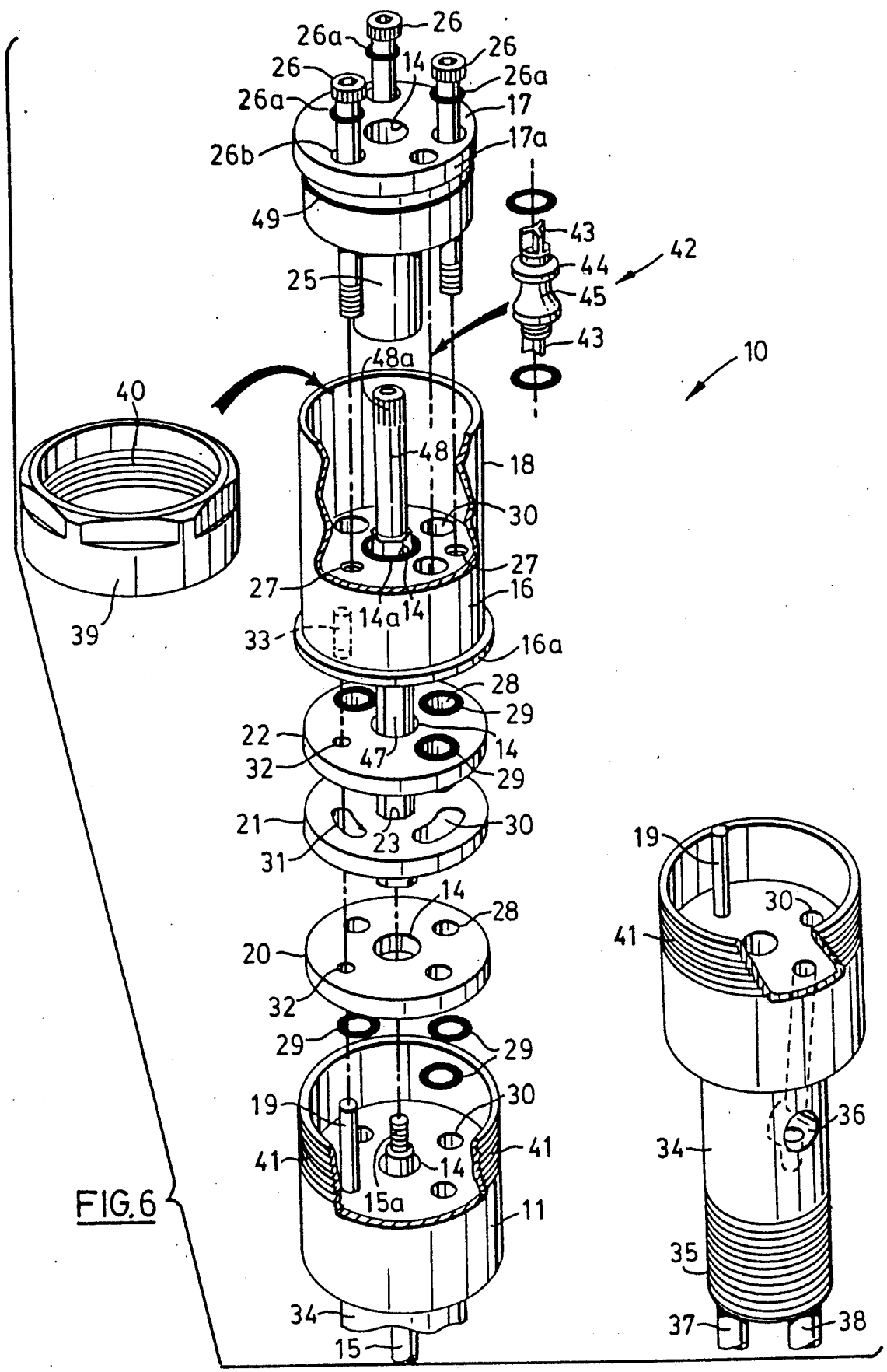
FIG. 6 is a partly exploded perspective view of the valve assembly of the present invention.

The upper and lower discs 20 and 22 each contain circular apertures 28 which are in register, when discs 20 and 22 are mounted on pin 19 and rod 15. The middle disc 21 includes two elongate or kidney shaped apertures 31a located in the disc such that when it is rotated counterclockwise as seen in FIG. 4, one of the outlets is closed. In FIG. 5, it can be seen that when the middle disc 21 is rotated clockwise, the other outlet is closed and the previous outlet is opened. In both instances, the inlet remains open. The apertures in the discs which provide the flow paths are all located along the same annulus on each disc.

Thus, in operation water flows into the assembly 10 via inlet 38 into flow path 12, it moves back flow valve 42 up and hence flows into connecting passage 25a and goes out through outlet path 13 to a spray (not shown) in the bidet. If the rod 48a is rotated, an alternative flow path is opened to the rim of the bidet (outlet 36) (not shown) and flow through path 13 may be cut off completely.

In addition, rod 15 is hexagonally shaped from the point where it fits within the discs and upwardly therefrom. The central aperture 23 in disc 21 is also hexagonally shaped, so that movement of the rod 15 produces movement (rotation) of disc 21. The upper surface of disc 22 and the lower portion of disc 20 includes as part of each aperture 28, recesses for O-rings 29 which seal the flow paths of the assembly against leakage.

The middle body portion 16 includes a protruding flange or rim portion 16a over which collar or retaining ring 39, containing internal screw threads 40, fits. These parts (16a, 39) permit the middle body portion 16 to be secured to lower body portion 11, on engagement of the threaded parts 41 and 40. No extra sealing is required at this joint since it is inherently watertight.

Middle body portion 16 includes an upper hollow cylindrical part 18. Three circular apertures 30b are provided in portion 16 for fluid flow (one inlet path, two outlet paths). Central aperture 14 is present, and there are three additional, smaller diameter, internally screw threaded apertures 27 into which set screws 26 may be received. Set screws 26 extend through apertures 26b in top portion 17, with each containing sealing means, preferably O-rings 26a to prevent fluid leakage. About central aperture 14 in body 16 is sealing means, preferably O-ring 14a on which rests a cylindrical lower extension 25 of top body portion 17. This ensures that the central aperture 14 is sealed against leakage. The cylindrical extension 25 also serves as a guide when the top portion 17 is joined to the middle portion 16 for assembly. The top body portion 17 includes a top piece 17a which provides a rim or cover for the valve assembly. Sealing means, preferably an O-ring 49 is provided beneath it and it engages the top edge of the middle body portion and again seals against fluid leakage.

Located within the inlet flow path, leading from inlet 38 is a check valve 42, which functions as a back-flow preventer or vacuum breaker. The check valve 42 is spool shaped 45 with ends 44, at the edges of which are found O-rings 45a. As best seen in FIG. 1, these ends 44 and O-rings 45a seal the inlet when no water flows into the system or back flow occurs, as follows. At the lower position, as shown, the lower end 44 of the valve and O-ring 45 rest at the base of an enlarged portion or valve seat of the inlet, sealing it, while at an upper position, the upper edge rests at the top of this enlarged portion or valve seat of the inlet, sealing the inlet from atmosphere, this latter position being that at which the valve remains during fluid flow into the valve assembly. Each of the ends 44 of the spool includes narrower, extended portions 43 formed preferably in the shape of a star or cruciform. This shape is selected to ensure that the valve moves freely up and down in the inlet path in response to changes in pressure or direction of air or water. The inlet passage is sized so that the extended portions 43 can only move in the narrower parts of the inlet path. This provides vertical alignment as well as reliable operation. The fluid inlet 38 and corresponding path is vented to atmosphere via opening 46 in the top of top body portion 16. When back flow occurs, it will leak out this opening 46.

In operation, water comes up flow path 12 from inlet 38. Depending on how the diverter valve is positioned via a handle, which may comprise an inner generally cup shaped part 48b connected to the top 48a of rod 48 by screw 48c, and an outer generally cup shaped cover part connected to the inner part 48 by cooperating screw threads 48e and 48f flow may be directed to outlet 37 (spray) or outlet 36 (rim). In such instance, valve 42 sits at the top of the passage sealing atmospheric vent 46, thus preventing leakage of potable water. When back flow occurs, valve 42 sits at the base of the passage, sealing the inlet flow path.

The rod 15 may be a pop-up drain control which is actuated by the diverter valve handle 48b (shown in outline). Operation is smooth and simple. Rod 15 may comprise several sections. For example, in FIG. 1, at 15b there is a screw threaded connection 15a to the portion 47 which is shaped to engage and rotate center disc 21, in this case hexagonal. Another such connection may be made as required and in accordance with conventional constructions.

Figure 7:
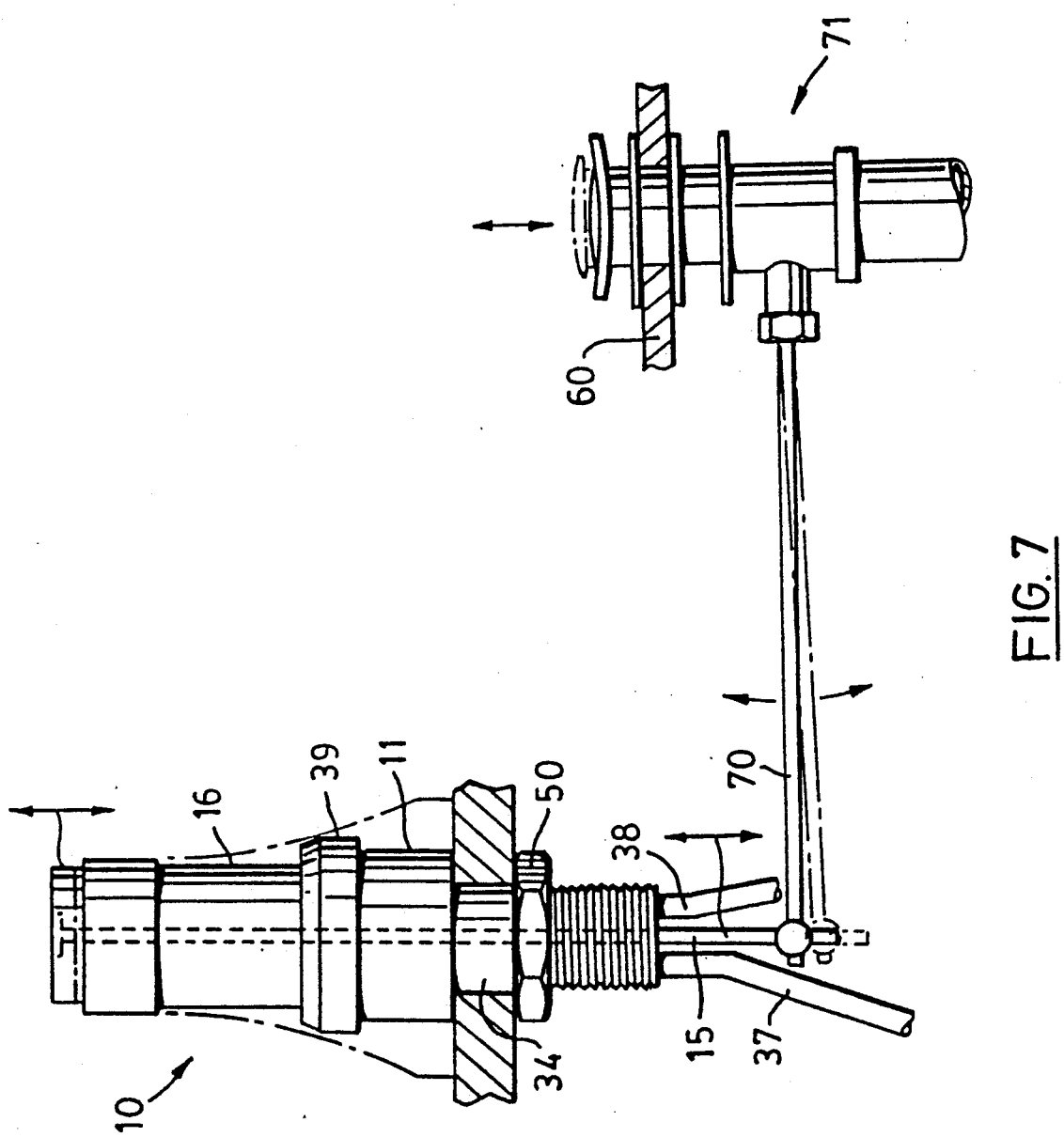
FIG. 7 is an elevational view, partly in cross-section, showing the valve assembly of FIG. 1 connected to the waste drain.

Rod 15 is connected in a conventional manner, as shown in FIG. 7, to a pop-up waste drain shown generally at 71 via a horizontally disposed rod 70. When rod 15 is moved axially, rod 70 moves simultaneously therewith to operate a pop-up waste drain 71 in a conventional manner well known to one having ordinary skill in this art.

The scope of the present invention should not be unduly limited by the choice of particular terminology. Equivalent or generic terminology may be substituted where appropriate.

Many changes may be made to the embodiment of the invention illustrated and described herein without departing from the spirit of the invention. The claims should not be limited unduly to the illustrated and described embodiment.

What is claimed is:

1. A valve assembly for mounting on a plumbing fixture comprising a body having a fluid inlet and corresponding flow paths and a plurality of fluid outlets and corresponding flow paths, a passage connecting the inlet flow paths to the outlet flow paths, a central aperture for receiving a rod, the aperture being adapted to permit reciprocal axial and rotational movement of the rod therein; a lower body portion to which the inlets and outlets are connected having a part of the central aperture for receiving the rod; the lower body portion having a hollow cylindrical upper end adapted to receive three discs, a pin located therein, on which the three discs are mounted, one on top of the other, each having a central aperture therein for receiving the rod, while permitting free axial movement of the rod therein, the middle disc being rotatable relative to the pin and rotatable relative to the top and bottom discs which are fixed in place by the pin, additional apertures provided in the discs which on being aligned provide fluid flow through the assembly from an inlet to a selected outlet; a middle body portion having a recess for receiving the top of the pin, a part of the central aperture for receiving the rod, and a plurality of apertures corresponding to the number of flow paths in the assembly, a hollow, cylindrical upper end adapted to receive a top body portion; the top body portion having a part of the central aperture and a lower hollow cylindrical projection for receiving the rod, the rod on reciprocal axial movement opening and closing a drain in the plumbing fixture to which it is connectable.

2. A valve assembly as claimed in claim 1 wherein: a back-flow prevention means is provided comprising a spool shaped valve located in each inlet flow path contained within the middle and top body portions, the inlet flow path being open to atmosphere and sized to contain and guide the spool shaped valve which has narrower, upper and lower ends which project into, and move within narrower, upper and lower portions, respectively, of the inlet flow path so that the valve remains aligned within the inlet flow path but travels freely therein between upper and lower valve seats, in response to changes in fluid flow direction and atmospheric pressure, and sealing means on the valve for engaging the valve seats.

3. A valve assembly for mounting on a plumbing fixture comprising a body with a fluid inlet and corresponding flow paths and a plurality of fluid outlets and corresponding flow paths, a passage connecting the inlet flow paths to the outlet flow paths, a central aperture for receiving a rod, the aperture being adapted to permit reciprocal axial and rotational movement of the rod therein; a lower body portion to which the inlets and outlets are connected having a part of the central aperture for receiving the rod; the lower body portion having a hollow cylindrical upper end adapted to receive three discs, a vertical pin located therein, on which the three discs are mounted, one on top of the other, each having a central aperture therein for receiving the rod, while permitting free axial movement of the rod therein, on rotational movement of the rod, relative to the top and bottom discs which are fixed in place by the pin, additional apertures are provided in the discs which on being aligned provide fluid flow through the assembly from an inlet to a selected outlet; a middle body portion having a recess for receiving a top portion of the pin, a part of the central aperture for receiving the rod, and a plurality of apertures corresponding to the number of flow paths in the assembly, the middle body portion having a hollow cylindrical upper end adapted to receive a top body portion; a spool shaped valve located in the inlet flow path contained within the middle and top body portions, the inlet flow path being open to atmosphere and sized to contain and guide the spool shaped valve which has narrower, upper and lower ends which project into, and move within narrower, upper and lower portions, respectively, of the inlet flow path so that the valve remains aligned within the path but travels freely therein between upper and lower valve seats in response to changes in fluid flow direction and atmospheric pressure, and sealing means on the valve for engaging the valve seats, the top body portion having a part of the central aperture and a lower hollow cylindrical projection for receiving the rod.

4. A valve assembly as claimed in claim 3 wherein the rod is a pop-up drain or waste control rod.

5. A valve assembly as claimed in claim 4 wherein a handle is attached to the top of the rod for rotating the rod for moving the middle disc and raising and lowering the pop-up drain or waste control rod.

6. A valve assembly as claimed in claim 3 wherein said upper and lower portions of the spool shaped valve are identical and are shaped in the form of a star or cruciform.

7. A valve assembly as claimed in claim 6 wherein said top body portion and the middle body portion are secured together with set screws, which extend from the top body portion into screw threaded recesses in the middle body portion and sealing means are provided between the two portions to prevent leakage into the central aperture and to the outside of the assembly, and the middle body portion is secured to the lower body portion by means of a retaining ring which slips over the exterior of the middle body portion, securing a rim portion thereof, which ring is internally screw threaded and cooperatively engages external screw threading on the exterior of the lower body portion.

8. A valve assembly as claimed in claim 7 wherein sealing means are provided around the apertures for the flow paths on the upper and lower surfaces of the discs.

9. A valve assembly for mounting on a bidet comprising a body with a fluid inlet and a corresponding flow path and two fluid outlets and two corresponding flow paths, a passage connecting the inlet flow path to the outlet flow paths, a central aperture for receiving a pop-up drain or waste control rod, the aperture being adapted to permit reciprocal axial and rotational movement of the rod therein; a lower body portion to which the inlet and outlets are connected and having a part of the central aperture adapted to receive the rod; the lower body portion having a hollow cylindrical upper end adapted to receive three ceramic discs, a pin located therein on which the three discs are mounted, one on top of the other, each having a central aperture therein for receiving the rod, the middle disc having three kidney shaped apertures therein and being rotatable with the rod, on rotational movement thereof, middle disc rotation being restricted by the length of an aperture therein in which said pin is located and being relative to the top and bottom discs which are fixed in place by the pin which fits through correspondingly shaped apertures therein, each of the top and bottom discs having three additional round apertures spaced about the disc on an annulus thereof, all apertures in all discs being positioned so that when the middle disc is rotated in either direction, the inlet flow path and a respective one of the outlet flow paths is connected; a middle body portion having a recess for receiving the top of the pin, a part of the central aperture for receiving the rod, and an aperture for each of the flow paths; the middle body portion having a hollow cylindrical upper end adapted to receive a top body portion; a spool shaped valve located in the part of the inlet flow path contained within the middle and top body portions, the flow path being open to atmosphere through the top body portion and sized to contain and guide the spool shaped valve having star or cruciform shaped upper and lower ends which project into and move within narrower upper and lower portions, respectively, of the flow path, the valve travelling freely between upper and lower valve seats, in response to changes in fluid flow direction and atmospheric pressure, sealing means on the valve to engage the valve seats, the top body portion having a part of the central aperture and a lower hollow cylindrical projection and associated sealing means for receiving the pop-up drain rod and sealing it from the passage connecting the inlet and outlet flow paths, which rod extends above the top of the body to permit a handle to be attached thereto, the valve assembly being adapted to receive a decorative escutcheon when required; the top and middle body portion being joined by set screws and including sealing means for each screw and between the portions; the middle and lower body portion being secured together by a removable retaining ring; and mounting means for securing the valve assembly to a bidet.

10. A diverter valve assembly for mounting on a plumbing fixture comprising:
a body having a fluid inlet and corresponding flow paths and a plurality of fluid outlets and corresponding flow paths,
a single operating means mounted in said body for rotational and reciprocal axial movement for fluid flow and drain control, which on rotational movement permits selective flow of fluid from said fluid inlet to at least one of said fluid outlets and on reciprocal axial movement opens and closes a waste drain in the fixture;
valve means for fluid flow control comprising at least three vertically aligned, stacked discs in said body, at least one of said discs being rotatable by said operating means relative to the other discs; and
apertures in said discs which are alignable in respective positions of relative rotation of said discs to provide selective flow paths for fluid flow from said inlet to at least one of said outlets.

11. A valve assembly as claimed in claim 10 wherein the body includes one fluid inlet and two fluid outlets and the assembly is mounted on a bidet so that the inlet is connectable to a water supply, one outlet leads to a rim outlet on the bidet and the other to a spray outlet in the bidet.

12. A diverter valve assembly as claimed in claim 10 wherein:
said single operating means comprises a rod mounted in a central aperture of the assembly for reciprocal axial and rotational movement of said rod in said aperture, said rod being operatively connected to a pop-up waste drain; and
said fluid flow control valve means comprises three vertically aligned, stacked discs, each disc having a central aperture adapted to receive said rod so that the top and bottom discs remain fixed while the middle disc rotates with said rod between selected positions for diverting fluid flow from one outlet to another outlet through flow paths formed by mating of said disc apertures; and sealing means for the flow paths are provided on outer faces of said top and bottom discs.

13. A diverter valve assembly as claimed in claim 12 wherein:
said sealing means comprise O-rings.

14. A diverter valve assembly as claimed in claim 12 wherein:
said rod has a top portion and a handle is mounted on said top portion for operation of the rod.

15. A diverter valve assembly as claimed in claim 14 wherein a decorative escutcheon is mounted on the assembly.

16. A valve assembly as claimed in claim 10 and further comprising:
back-flow prevention means in said body.

17. A diverter valve assembly as claimed in claim 16 wherein said back-flow prevention means is located in an inlet flow path.

18. A diverter valve assembly as claimed in claim 16 wherein:
said back-flow prevention means comprises a free floating valve which is adapted to move between valve seats provided in the inlet flow path in response to changes in atmospheric pressure and fluid flow, and the inlet flow path is vented to atmosphere.

19. A diverter valve assembly as claimed in claim 10 wherein:
the plumbing fixture is a bidet.

20. A diverter valve assembly as claimed in claim 10 wherein said discs are ceramic.

* * * * *